United States Patent
Heulens et al.

(10) Patent No.: US 10,458,000 B2
(45) Date of Patent: Oct. 29, 2019

(54) PLASMA AND OXYGAS FIRED FURNACE

(71) Applicant: Umicore, Brussels (BE)

(72) Inventors: Jeroen Heulens, Kerkom (BE); Bart De Cooman, Hoboken (BE); Maarten Quix, Hoboken (BE)

(73) Assignee: UMICORE, Brussels (BE)

( * ) Notice: Subject to any disclaimer, the term of this patent is extended or adjusted under 35 U.S.C. 154(b) by 138 days.

(21) Appl. No.: 15/527,358

(22) PCT Filed: Nov. 10, 2015

(86) PCT No.: PCT/EP2015/076130
§ 371 (c)(1),
(2) Date: May 17, 2017

(87) PCT Pub. No.: WO2016/078959
PCT Pub. Date: May 26, 2016

(65) Prior Publication Data
US 2017/0321300 A1    Nov. 9, 2017

(30) Foreign Application Priority Data

Nov. 19, 2014  (EP) ..................................... 14193771

(51) Int. Cl.
*C22B 4/08* (2006.01)
*C22B 4/00* (2006.01)
*C22B 7/00* (2006.01)
*F27D 99/00* (2010.01)
*C22B 9/22* (2006.01)
*C22B 15/00* (2006.01)

(52) U.S. Cl.
CPC ............ *C22B 15/003* (2013.01); *C22B 4/005* (2013.01); *C22B 4/08* (2013.01); *C22B 7/001* (2013.01); *C22B 9/226* (2013.01); *F27D 99/0033* (2013.01); *F27D 2099/0031* (2013.01); *F27D 2099/0036* (2013.01); *Y02P 10/214* (2015.11)

(58) Field of Classification Search
CPC ........... C22B 7/001; C22B 4/005; C22B 4/08; C22B 7/04; C22B 9/226; F27D 99/0031; F27D 2099/0036
See application file for complete search history.

(56) References Cited

U.S. PATENT DOCUMENTS

| | | | |
|---|---|---|---|
| 4,486,229 A | 12/1984 | Troup | |
| 8,557,174 B2 * | 10/2013 | Van Camp | C22B 4/005 266/218 |
| 2010/0050814 A1 | 3/2010 | Van Camp | |
| 2015/0040722 A1 * | 2/2015 | Santen | C21B 3/00 75/10.22 |
| 2015/0232961 A1 * | 8/2015 | Imris | C22B 5/16 501/1 |

FOREIGN PATENT DOCUMENTS

WO      2005031014        4/2005
WO      WO 2005080610 A  *  9/2005

OTHER PUBLICATIONS

International Search Report for PCT/EP2015/076130, dated Jan. 26, 2016.

* cited by examiner

*Primary Examiner* — Tima M. McGuthry-Banks
(74) *Attorney, Agent, or Firm* — NK Patent Law

(57) ABSTRACT

The present disclosure concerns an apparatus suitable for smelting and separating metals in flexible oxido-reduction conditions. More particularly, it concerns an apparatus for smelting metallurgical charges comprising a bath furnace susceptible to contain a molten charge up to a determined level, characterized in that the furnace is equipped with: at least one non-transfer plasma torch for the generation of first hot gases; at least one oxygas burner for the generation of second hot gasses; and, submerged injectors for injecting said first and second hot gases below said determined level.

8 Claims, No Drawings

PLASMA AND OXYGAS FIRED FURNACE

This application is a National Stage application of International Application No. PCT/EP2015/076130, filed Nov. 10, 2015. This application also claims priority under 35 U.S.C. § 119 to European Application No. 14193771.4, filed Nov. 19, 2014.

The present disclosure concerns an apparatus suitable for smelting and separating metals in flexible oxido-reduction conditions.

Oxygas burners have been used in pyrometallurgy for smelting complex metallurgical charges. This technology is well suited for maintaining oxidizing conditions such as for conversion of sulfidic feeds to metals and $SO_2$. It is also useful when mildly reducing conditions are required such as for the reduction of easily reducible metals like PGM's or copper. However, the reduction of less noble elements such as iron is well outside the feasible domain of oxygas burners.

When strongly reducing conditions are needed, a burner has to operate with a very lean mixture, producing essentially CO and little or no $CO_2$. The useable enthalpy of the burner gases is consequently much lower and may become insufficient to compensate for the thermal losses in the furnace and/or to provide enough heat to drive endothermic reactions such as the reduction of metal oxides. The flow rates to the burner can be increased, but this also increases the gas volumes to be processed in the baghouse and in the post combustion apparatus.

Plasma burners on the other hand are suitable to generate a very high useable enthalpy while keeping the gas flow rates relatively low, also with a very lean gas mixture. However, they have their own limitations, one disadvantage being the consumption of electricity, a rather expensive source of energy in many countries. Another one is related to the higher wear and the ensuing maintenance costs.

Metallurgical processes often comprise a series of oxidation and reduction steps, sometimes intermixed with phase separations. Different furnaces are typically used in each step, the molten or solidified phases being transferred from furnace to furnace. Each furnace is then optimized to operate in a specific range of oxidizing or reducing conditions.

It has now been found that a single apparatus can be suitably equipped with both an oxygas burner and a plasma burner, provided that both technologies are implemented in a compatible way. This ensures a smooth transition between the oxygas mode and the plasma mode, without the need to reconfigure the apparatus in any way. In fact, both modes could be run simultaneously if needed, e.g. when a very high energy input would be requested. Moreover, the molten bath can be kept within the same furnace, greatly streamlining the sequential process steps.

To this end, the enthalpy is introduced directly into the bath in the form of hot gasses through at least 2 submerged tuyeres, one equipped with an oxygas burner, the other with a plasma burner. When more than 2 tuyeres are provided, the types of burners can be mixed and matched in function of the desired metallurgy.

Tuyeres should preferably be short, so as to incur a minimum of wear and tear. This also ensures low thermal losses. They can be mounted horizontally, piercing the wall of the furnace under the level of the bath. The burners, whether plasma- or oxygas-fired are then located outside the furnace in a submergible (a.k.a. "submerged") position; they need to be constantly fed with gas to avoid the molten mass to flow back, causing serious damages. Alternatively, the tuyeres can be mounted at an angle, still blowing into the bath, but allowing for the burners to reside above the level of the bath and outside the furnace. This layout results in slightly longer tuyeres, but guarantees that no molten matter will be able flow back into the burners. Although this may be less recommended in large furnaces, the tuyeres could also be placed vertically.

The apparatus is particularly versatile as to the oxido-reduction potential ($pO_2$) that can be achieved. While the oxygas burner lends itself ideally for introducing supplementary oxygen into the melt (by applying a rich gas-oxygen mixture), the plasma burner is ideally suited for the introduction of supplemental reducing agent (by adding natural gas along with the plasma gas or else by introducing it as a sheathing gas around the plasma).

The described apparatus is particularly suitable for treating metallurgical charges made up of recycled materials as those collected in "urban mines". Such feeds are notoriously inhomogeneous and real-time process control is needed to steer both the bath temperature and the reduction. Herein lies the main advantage of the dual burner furnace as it provides a supplemental degree of freedom to the operator: the enthalpy input can indeed be modulated independently of the redox potential, a feat that is impossible to realize with an oxygas burner alone. Using an electric plasma alone solves the problem of enthalpy input in reducing conditions. However, steering the process towards a precise $pO_2$ is difficult: the amount of gas injected into the bath is low, with as a result a $pO_2$ that is dominated by the widely diverging characteristics of the charge. This is realized while mitigating the working expenses, a feat that is difficult to achieve with a plasma burner alone.

A process allowing to more easily maintain these two parameters under control is needed.

To this end, an apparatus is presented for smelting metallurgical charges comprising a bath furnace susceptible to contain a molten charge up to a determined level, characterized in that the furnace is equipped with: at least one non-transferred plasma torch for the generation of first hot gases; at least one oxygas burner for the generation of second hot gasses; and, submerged injectors for injecting said first and second hot gases below said determined level.

Non-transferred plasma torches contrasts with transferred plasma where the electrode is typically made out of carbon: a carbon electrode has the disadvantage of fixing the reducing conditions, thereby spoiling the versatility of the equipment.

By submerged injector is meant a connection pipe or tuyere between a gas source and an injection point that is located below the bath level, thus in a submerged position. This ensures a direct contact between the gas and the molten mass.

By non-transferred plasma torch is meant a thermal gas generator using a plasma torch whereby an electrical arc is maintained between electrodes internal to the torch unit. A gas is entered through an input port into a flow-through chamber, in which an electric arc is maintained. The gas heats up to extreme temperatures and is expelled as a plasma through an output port.

By oxygas burner is meant a thermal gas generator mixing and burning a carbon-bearing fuel and an oxygen-bearing gas. The mixing zone is inside the burner unit, while the combustion zone may be internal or external to the unit.

It is moreover preferred to have at least one burner and at least one torch located below said determined level. This setup indeed allows for very short connection pipes, the hot gas generator being locatable at the level of the injection point, on the outside of the furnace. Measures are however needed to avoid flooding of the generator by the molten mass. A continuous protective gas flow through the injector may be used.

The envisioned metallurgy requires the enthalpy to be provided in a versatile way by the plasma torches and by the oxygas burners. Both systems should be able to deliver the needed heath in the different process steps. To this end the ratio of the total nominal enthalpy expressed as MJ/s of the oxygas burner(s) to that of the plasma torch(es) should preferably be 1:5 to 5:1. Similarly, the ratio of the total nominal gas flow rate expressed as $Nm^3/s$, susceptible to be fed into the oxygas burner(s) to that susceptible to be fed into the plasma torch(es) should preferably be 1:10 to 10:1. By "nominal" is meant the nameplate maximum value.

The furnace should have a rather high height to diameter ratio to cope with the intensive splashing of molten matter further to the submerged gas injection. Assuming a furnace with a cylindrical bottom of diameter d end a height h, the ratio h/d should preferably be more than 4.

Such an apparatus is useful for many different smelting flow sheets in the field of metallurgy.

In a first embodiment, the apparatus can be used in a process for smelting metallurgical charges, comprising the steps of feeding a metallurgical charge including transition metals and slag formers to the furnace; smelting the charge using the oxygas burner(s) as primary enthalpy source, thereby forming an alloy comprising a first part of the transition metals and a slag comprising a second part of the transition metals; treating the slag in strongly reducing conditions using the plasma torch(es) as primary enthalpy source, thereby forming an alloy enriched in transition metals and a slag depleted in transition metals by transferring said second part of the transition metals from the slag to the alloy; and, separating the alloy and the depleted slag by tapping.

In a second embodiment, the apparatus can be used in a process for smelting metallurgical charges, comprising the steps of feeding a metallurgical charge including transition metals and slag formers to the furnace; smelting the charge using the oxygas burner(s) as primary enthalpy source, thereby forming a first alloy comprising a first part of the transition metals and a slag comprising a second part of the transition metals; separating the first alloy by tapping, leaving the slag in the furnace; treating the slag in strongly reducing conditions using the plasma torch(es) as primary enthalpy source, thereby forming a second alloy enriched in transition metals and a slag depleted in transition metals by transferring said second part of the transition metals from the slag to said second alloy; and, separating the second alloy and the depleted slag by tapping.

These two embodiments result in the production of a "clean" slag, i.e. free of undesired elements. Volatile elements such as Zn or Cd can be extracted by fuming; non-volatile elements such as Cu and Co can be transferred to the alloy phase. Suitable reducing conditions are needed in both cases; these are well known to the skilled person, in terms of $pO_2$ to be achieved. They can be obtained by a reduced inflow of oxygen-bearing gas or by an inflow of carbon-bearing species. The suitability of the conditions can be verified, and if needed corrected, by analyzing the composition of the phases. Such an analysis can be performed in real-time during the completion of the process.

In a third embodiment, the apparatus can be used in a process for smelting metallurgical charges, comprising the steps of feeding a metallurgical charge including transition metals and slag formers to the furnace; smelting the charge in strongly reducing conditions using the plasma torch(es) as primary enthalpy source, thereby forming an alloy comprising transition metals and a first slag depleted in transition metals; separating the first slag by tapping, leaving the alloy in the furnace; treating the alloy using the oxygas burner(s) as primary enthalpy source, thereby forming an alloy partially depleted in transition metals and a second slag enriched in transition metals by transferring part of the transition metals from the alloy to the second slag; and, separating the enriched alloy and the second slag by tapping.

The third embodiment describes the use of the apparatus in a sequence comprising a reduction followed by an oxidation. The final slag is not "clean", but could in practice be recirculated to the first step of the process, as part of the feed.

By primary enthalpy source is meant that the source provides for more than 50% of the total enthalpy expressed in MJ supplied to the furnace.

In the above processes, it is preferred to perform the submerged injections at a level where the gasses are blown into the slag. However, e.g. the alloy treatment step according to above-mentioned third embodiment could also be performed by injecting the gasses into the alloy.

This combination allows for a deep reduction, a sufficient input of enthalpy, and gives sufficient versatility to maintain the desired conditions even in case of a highly variable feed.

EXAMPLE: CU-NI-FE SEPARATION IN A FURNACE EQUIPPED WITH OXYGAS BURNER AND PLASMA TORCH

A batch of 6 tons of roasted Cu—Ni—Fe concentrate with composition according to Table 1 is processed in an open bath furnace to valorize Cu and Ni in an economical and efficient way. The bath furnace is equipped with a 3 MW non-transferred plasma torch connected to a submerged tuyere on one hand, and another submerged tuyere in which a 1.5 MW oxygas burner resides. The inner diameter of the furnace is 1.5 m and the useable height (bottom to feed port) is 7 m.

TABLE 1

| Composition of the feed (wt. %) | | | | | | |
|---|---|---|---|---|---|---|
| Cu | Ni | Fe | CaO | $SiO_2$ | $Al_2O_3$ | MgO |
| 2.5 | 5 | 22 | 3.8 | 40 | 3.8 | 4 |

In a first step, mildly reducing conditions are imposed at 1200° C. with an oxygas burner to reduce much of the Cu present in the concentrate and collect Ni and Fe in a slag phase. In a batch process of 12 h, the abovementioned concentrate is charged at 0.5 ton/h together with 0.1 ton/h of limestone as fluxing agent. To maintain the heat balance of the furnace with a bath temperature of 1200° C. and appropriate lambda of 0.7, the oxygas burner injects 200 $Nm^3/h$ natural gas and 240 $Nm^3/h$ oxygen into the bath. After a 12 h batch, about 160 kg of a first alloy is formed, and 5.8 tons of a Ni—Fe bearing slag. The respective compositions are shown in Tables 2 and 3.

TABLE 2

| Composition of the first alloy (wt. %) | | |
|---|---|---|
| Cu | Ni | Fe |
| 94 | 1.8 | 4 |

TABLE 3

| Composition of the slag (wt. %) | | | | | | |
|---|---|---|---|---|---|---|
| Cu | Ni | Fe | CaO | SiO$_2$ | Al$_2$O$_3$ | MgO |
| 0.025 | 5 | 22.5 | 15 | 41 | 3.9 | 4.1 |

The alloy is tapped, the oxygas burner is shut down, maintaining a safety flow of nitrogen through tuyere, and the plasma torch is started to heat the slag bath to 1500° C. for Ni and Fe recovery. After a 3 h batch, about 1.6 tons of a Fe—Ni second alloy is obtained, and 4.1 ton of a cleaned slag. The respective compositions are shown in Tables 4 and 5.

TABLE 4

| Composition of the second alloy (wt. %) | | |
|---|---|---|
| Cu | Ni | Fe |
| 0.09 | 18.5 | 81.4 |

TABLE 5

| Composition of the cleaned slag (wt. %) | | | | | |
|---|---|---|---|---|---|
| Ni | Fe | CaO | SiO$_2$ | Al$_2$O$_3$ | MgO |
| 0.02 | 0.3 | 30 | 58 | 5.5 | 5.8 |

The plasma torch is operated at strongly reducing conditions with 700 Nm$^3$/h air as plasma gas, and 500 Nm$^3$/h natural gas to obtain a mean lambda of 0.3 for the injected gases. The electric power to the plasma torch in this process step is 2.3 MW. To maintain a liquid slag, 0.2 ton/h of limestone is added during the slag cleaning step. The example illustrates the use of both heating technologies according to different metals to be recovered.

The invention claimed is:

1. A process for smelting metallurgical charges, comprising:
    providing an apparatus comprising a bath furnace susceptible to contain a molten charge up to a determined level, characterized in that the furnace is equipped with:
        at least one non-transferred plasma torch for the generation of first hot gases;
        at least one oxygas burner for the generation of second hot gases gasses; and,
        submerged injectors for injecting said first and second hot gases below said determined level;
    feeding a metallurgical charge including transition metals and slag formers to the furnace;
    smelting the charge using the oxygas burner(s) as a primary enthalpy source, thereby forming an alloy comprising a first part of the transition metals and a slag comprising a second part of the transition metals;
    treating the slag in strongly reducing conditions using the plasma torch(es) as primary enthalpy source, thereby forming an alloy enriched in transition metals and a slag depleted in transition metals by transferring said second part of the transition metals from the slag to the alloy; and,
    separating the alloy and the depleted slag by tapping.

2. A process for smelting metallurgical charges, comprising:
    providing an apparatus comprising a bath furnace susceptible to contain a molten charge up to a determined level, characterized in that the furnace is equipped with:
        at least one non-transferred plasma torch for the generation of first hot gases;
        at least one oxygas burner for the generation of second hot gases; and,
        submerged injectors for injecting said first and second hot gases below said determined level;
    feeding a metallurgical charge including transition metals and slag formers to the furnace;
    smelting the charge using the oxygas burner(s) as a primary enthalpy source, thereby forming a first alloy comprising a first part of the transition metals and a slag comprising a second part of the transition metals;
    separating the first alloy by tapping, leaving the slag in the furnace;
    treating the slag in strongly reducing conditions using the plasma torch(es) as primary enthalpy source, thereby forming a second alloy enriched in transition metals and a slag depleted in transition metals by transferring said second part of the transition metals from the slag to said second alloy; and,
    separating the second alloy and the depleted slag by tapping.

3. A process for smelting metallurgical charges, comprising the steps of:
    providing an apparatus comprising a bath furnace susceptible to contain a molten charge up to a determined level, characterized in that the furnace is equipped with:
        at least one non-transferred plasma torch for the generation of first hot gases;
        at least one oxygas burner for the generation of second hot gases; and,
        submerged injectors for injecting said first and second hot gases below said determined level;
    feeding a metallurgical charge including transition metals and slag formers to the furnace;
    smelting the charge in strongly reducing conditions using the plasma torch(es) as a primary enthalpy source, thereby forming an alloy comprising transition metals and a first slag depleted in transition metals;
    separating the first slag by tapping, leaving the alloy in the furnace;
    treating the alloy using the oxygas burner(s) as primary enthalpy source, thereby forming an alloy partially depleted in transition metals and a second slag enriched in transition metals by transferring part of the transition metals from the alloy to the second slag; and,
    separating the enriched alloy and the second slag by tapping.

4. Apparatus for smelting metallurgical charges comprising a bath furnace susceptible to contain a molten charge up to a determined level, characterized in that the furnace is equipped with:
    at least one non-transferred plasma torch for the generation of first hot gases;
    at least one oxygas burner separate from the plasma torch for the generation of second hot gases; and,
    submerged injectors for injecting said first and second hot gases below said determined level of said molten charge in said bath furnace.

5. The apparatus according to claim 4, wherein said at least one burner and at least one torch are located below said determined level of said molten charge in said bath furnace.

6. The apparatus according to claim 4, wherein the ratio of a total nominal enthalpy expressed as MJ/s of the oxygas burner(s) to that of the plasma torch(es) is from 1:5 to 5:1.

7. The apparatus according to claim 4, wherein the ratio of the total nominal gas flow rate expressed as $Nm^3/s$, susceptible to be fed into the oxygas burner(s) to that susceptible to be fed into the plasma torch(es) is from 1:10 to 10:1.

8. The apparatus according to claim 4, wherein the furnace has a generally cylindrical shape, having a circular bottom with a diameter d, and sidewalls with a height h, the ratio of h to d being more than 4.

\* \* \* \* \*